Aug. 28, 1923.  1,466,237
H. K. LORENTZEN
MACHINING SAW TEETH AND THE LIKE
Original Filed Aug. 1, 1918
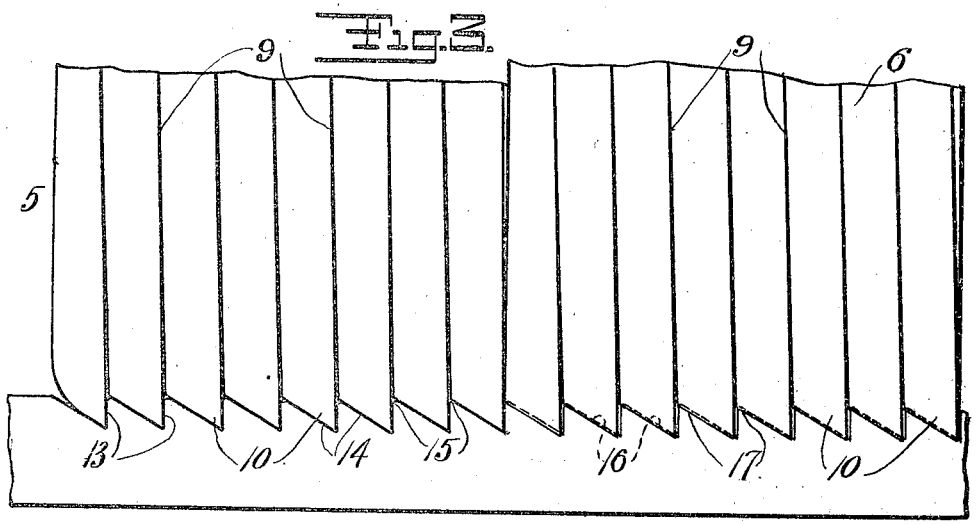
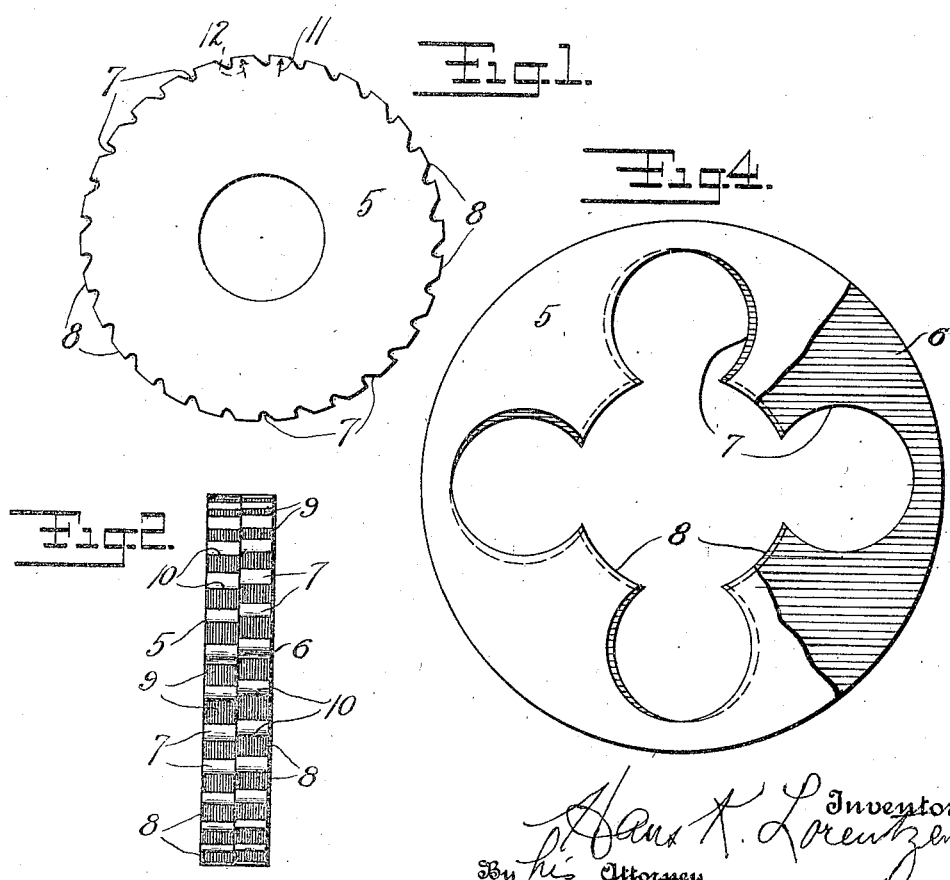
Inventor
Hans K. Lorentzen
By his Attorney Patented Aug. 28, 1923.

1,466,237

UNITED STATES PATENT OFFICE.

HANS K. LORENTZEN, OF NEW YORK, N. Y.

MACHINING SAW TEETH AND THE LIKE.

Application filed August 1, 1918, Serial No. 247,723. Renewed January 17, 1923.

*To all whom it may concern:*

Be it known that I, HANS K. LORENTZEN, a subject of the King of Denmark, residing at New York, in the county of New York and State of New York, have invented certain new and useful Improvements in Machining Saw Teeth and the like, of which the following is a specification.

My invention relates to the machining of saw teeth, screw threads and the like and one of the objects of the invention is to provide simple and effective means for this purpose.

A special object of the invention is to secure sharply defined, clean cut surfaces, the same being necessarily highly desirable in the lines of work mentioned.

In the carrying out of this invention I use two cutters, a primary cutter for roughing out the cut and a secondary cutter, alongside the first, for trimming the cut surfaces. The two cutters are made with helical cutter teeth of the same pitch and hence forming sections of one continuous helix and the cutters are set with the teeth of one cutter slightly in advance of the true pitch line. When the cutters are thus assembled alongside each other, the forward or leading cutter will make the cut, and the second or following cutter will trim the walls of the cut made by the first.

Other features of the invention will become apparent as the specification proceeds.

In the accompanying drawing I have illustrated the invention embodied in two different forms but I would have it understood that further modifications and changes may be made without departure from the scope of the appended claims.

In this drawing, Figure 1 is a side view of a form of the tool designed for cutting the teeth of a jeweler's saw; Figure 2 is an edge view of the same; Figure 3 is an enlarged and more or less diagrammatic view illustrating the successive cutting and trimming operations of the tool; Figure 4 is a broken view of a tool for cutting screw threads.

In the construction illustrated, the tool is made up of two separately constituted cutters 5 and 6, disposed side by side and consisting each of a substantially flat disk having notches 7, cut in the periphery thereof, to provide a series of peripheral cutters 8, in the nature of a milling tool. The peripheral faces of these cutters have a screw thread 9, formed therein, which is continuous except for the gaps between the cutters, this screw thread thus providing in effect, a series of helically disposed cutter teeth 10.

The two cutters are dulplicates to the extent at least of the helical cutter teeth of both being of the same pitch and hence forming successive sections of the one continuous helix.

A preferred method of obtaining this result is to turn the screw thread in the cutters while the two are held clamped in side by side relation.

In use, the cutters are relatively rotated a slight distance, say the length of one tooth, to break the pitch line and cause one to cut slightly in advance of the other. This setting may be secured by putting markers 11 and 12 on the two cutters and assembling them with these markers in a predetermined relation when the screw thread is being cut, and then, when the cutters are to be assembled for working, bringing them together with these markers partially rotated from the positions they formerly occupied.

The operation of the device in the cutting of a saw blade is illustrated in Figure 3. Here the cutter teeth are formed one-sided to produce a saw-tooth cut. The first or primary cutter 5, it will be seen makes the main cut, leaving, by reason of the fact that it makes both the vertical cuts 13 and the inclined cuts 14, somewhat dulled points 15, at the junctions of these cuts, or in other words, at the points of the saw teeth. The secondary cutter, by reason of the offset previously given it, in following the first cutter, cuts slightly in advance of the true or common pitch line of the two cutters and hence just trims the tops of the saw teeth cut by the first cutter. In thus trimming the saw teeth, the second cutter cuts down far enough to remove the portion 16 above the dulled part of the tooth, thereby leaving a clean sharp pointed tooth, as shown at 17. As the second cutter merely trims the top of the saw tooth and does not engage the vertical side thereof, any displacement of the metal will take place as a slight burr at the point of the tooth slightly overhanging the vertical side, and which is not objectionable.

The cutter teeth may be formed on the outer or an inner periphery of the tool. In the first case illustrated the teeth are formed on the outer periphery, but in the second form, illustrated in Figure 4, cutters provided are each in the form of an annulus, having the cutter teeth formed on the inner periphery thereof, for turning external screw threads on work in the nature of a rod or pipe, the teeth in this case being suitably formed to cut the screw threads.

I claim:

1. In a device of the character described, a pair of cutters disposed side by side and arranged to operate successively on the same piece of work, said cutters having helically arranged cutting teeth formed as successive sections of the same helix and one of said cutters being set so as to break the continuity of the composite helix of the two cutters, whereby to cause the second cutter to trim the cuts made by the first.

2. In a device of the character described, a cutter provided with a helically disposed set of cutter teeth and a second cutter arranged to operate with the first cutter on the same piece of work and provided with helically disposed cutter teeth of the same pitch as the cutter teeth of the first cutter but stepped in advance of the common pitch line of the two cutters to thereby cause the second cutter to trim the cuts made by the first.

3. In a device of the character described, a pair of cutters disposed in side by side relation and provided with helically arranged cutter teeth of the same pitch, one of said cutters having the teeth thereof advanced with respect to teeth of the corresponding pitch line on the other cutter to thereby cause the teeth of one cutter to trim the cuts made by the other.

4. In a device of the character described, a disk having helically disposed cutter teeth on the periphery thereof and a second disk having helically disposed teeth on the periphery thereof of the same pitch as the teeth of the first disk but offset to one side of the true pitch line to thereby trim the cuts made by the teeth of the first disk.

5. A milling tool having a notched periphery providing a series of cutters, having a screw thread formed in the peripheral portions thereof providing a plurality of helical cutter teeth, and a second tool at one side of the first tool having a similar set of helical cutter teeth of the same pitch as those of the first but offset out of the true pitch line.

6. In a device of the character described, a pair of cutters disposed side by side and arranged to operate successively on the same piece of work, said cutters having helically arranged cutting teeth on the periphery thereof formed as successive sections of the same helix and one of said cutters being set so as to break the continuity of the composite helix of the two cutters, whereby to cause the second cutter to trim the cuts made by the first.

7. The process herein disclosed, which consists in arranging in side-by-side relation two cutters which are provided with cutter teeth disposed to form parts of a continuous helix, relatively rotating the two cutters, to break the continuity of the said helix, and operating on the work with the cutters in said relatively rotated position.

In testimony whereof I affix my signature.

HANS K. LORENTZEN.